Oct. 7, 1958 R. L. GRIFFIN 2,855,089
CONVEYOR UNLOADING APPARATUS
Filed July 3, 1956 5 Sheets-Sheet 1

INVENTOR.
ROGER L. GRIFFIN
BY R. L. Story
ATTORNEY

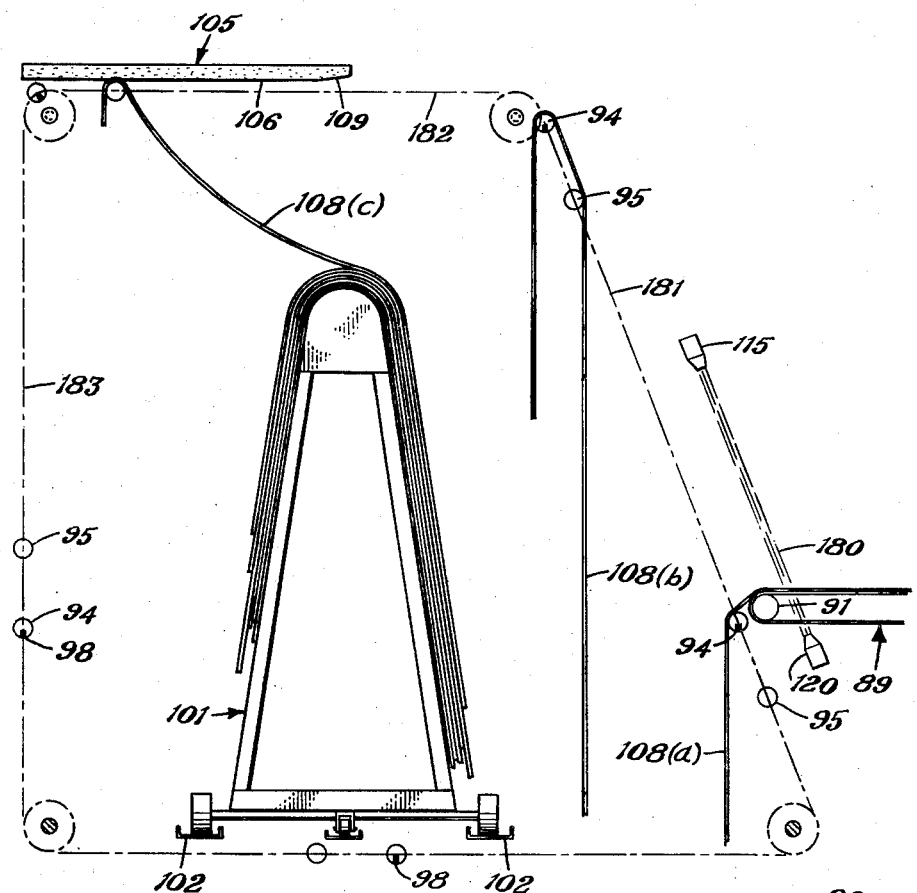
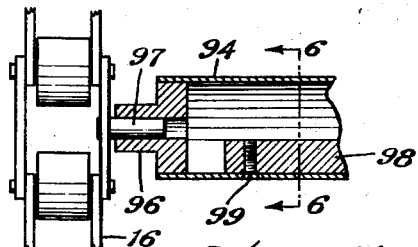
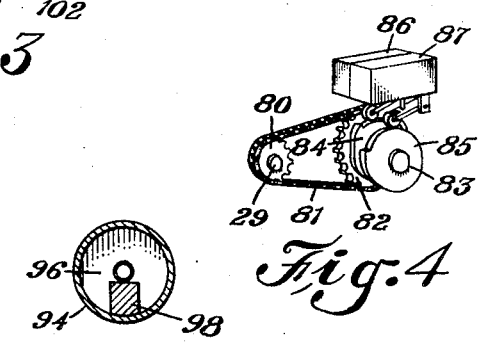

INVENTOR.
ROGER L. GRIFFIN
BY R. G. Stoy
ATTORNEY

Oct. 7, 1958  R. L. GRIFFIN  2,855,089
CONVEYOR UNLOADING APPARATUS
Filed July 3, 1956  5 Sheets-Sheet 4

INVENTOR.
ROGER L. GRIFFIN
BY R. G. Story
ATTORNEY

Oct. 7, 1958 R. L. GRIFFIN 2,855,089
CONVEYOR UNLOADING APPARATUS
Filed July 3, 1956 5 Sheets-Sheet 5
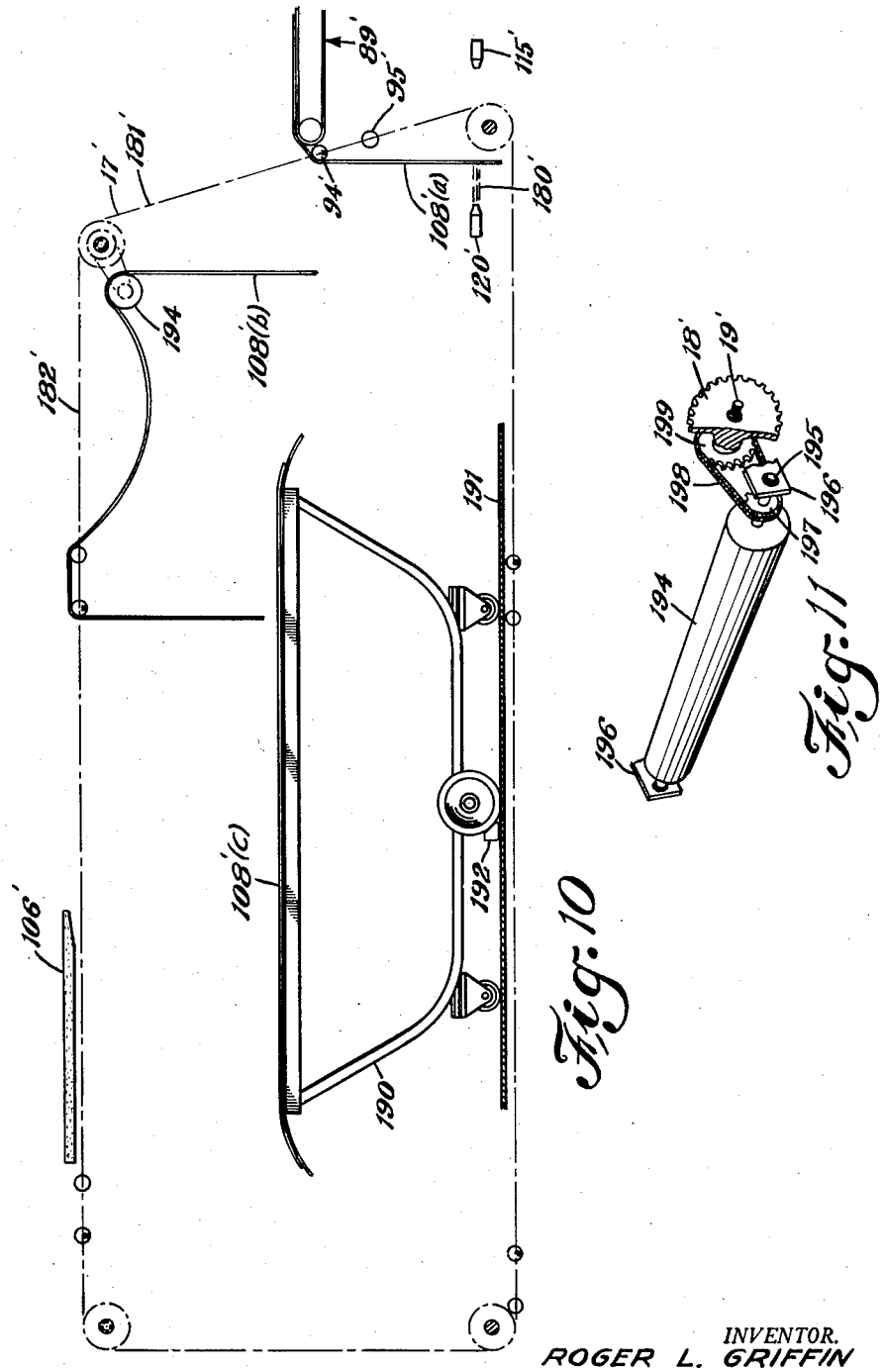
INVENTOR.
ROGER L. GRIFFIN
BY R. G. Story
ATTORNEY _United States Patent Office_

2,855,089
Patented Oct. 7, 1958

2,855,089

CONVEYOR UNLOADING APPARATUS

Roger L. Griffin, Manchester, Mass., assignor to Swift & Company, Chicago, Ill., a corporation of Illinois Application July 3, 1956, Serial No. 595,706

17 Claims. (Cl. 198—21)

The present invention relates to an apparatus for removing sheets of material from a conveyor and stacking them in a pile. It is particularly applicable for use in handling hides or sides of leather from the processing conveyors and loading them on carts.

The present invention is a continuation-in-part of my prior application, Serial No. 554,188, filed December 20, 1955, now abandoned.

In the manufacture of leather, particularly side leather, there are a number of steps of applications of various finishing materials to the leather. In doing this the leather is usually laid out flat on a conveyor and passed through a processing area during which a coat of finishing material is given to the leather and then the finished material is dried. This same series of steps is repeated as many as seven or eight times in regular processing. Even though the specific material added each time may be different, the repetition of the steps may be performed on the same apparatus in order to obtain most effective utilization of each piece of apparatus. In between each run and the time that the finishing material is changed, the sides of leather are stacked on horses or other forms of carts.

There are many other instances in the manufacture of leather when it is necessary to remove a hide which has been laid out flat on one conveyor to another spot and align the hide at that other spot. For example, it may be moved from one conveyor to another conveyor moving in a different direction. In the majority of instances today it is the practice of the industry generally to use hand labor to handle the sides of leather onto and off of the conveyor. Others have previously recognized the need for machines to do this job because of the expense of the hand labor involved, but machinery has not been widely utilized through the industry for this purpose. The principal reasons are one or more of the following:

The machines are expensive;
They are bulky in size;
They are intricate in operation, requiring extensive maintenance problems;
They are slow, requiring that the processing only be as fast as the machine is capable of removing the hides from the conveyors and stacking them up; and
The machines are not capable of handling all sizes and types of leather being processed today.

The principal object of the present invention is to provide an apparatus that will solve the disadvantages of the existing machinery previously mentioned and which will remove hides placed serially on a conveyor from that conveyor and stack them up in a neat pile as fast as the hides come from the conveyor. The machine is simple, relatively inexpensive and easily maintained. It can be employed to handle all types of leather and to stack it at a predetermined place on carts or other conveyances. The term "conveyor" as used herein is used not only to apply to such devices as are primarily employed for transporting objects, but also is applicable to apparatus that moves objects in conjunction with other mechanisms that act on the objects. For example, hides may be pressed at one stage of their processing and in conjunction with the press there is apparatus to move the hides into, through, and/or away from the press. Such apparatus is within the meaning of the word "conveyor" as employed herein.

One of the particular advantages of the present invention is the adaptability of the principles of the invention to various problems encountered in the handling of leather. It can stack the leather on a table, a flat cart or a wheeled "horse" often used in tanneries in the handling of sides of leather.

In some operations, for example in the manufacture of leather, the sides of leather are supported individually on suitable hangers and transported through a drier. Similar operations will be found in other industries. Another object of the present invention is to provide an apparatus which will hang the hides individually on rods which then can be transported through a drier or through other processing operations with the hides being removed from the rods and stacked after the completion of such processing.

Further objects and advantages will become apparent from the following description taken in conjunction with the drawings in which:

Figure 3 is a diagrammatic side view of the embodiment of Figure 1;

Figure 4 is an enlarged view of two control switches and the operating mechanism therefor;

Figure 5 is an enlarged view of the mounting of one of the rollers on the supporting chain;

Figure 6 is a section taken at line 6—6 of Figure 5;

Figure 10 is a diagrammatic side view of another embodiment of the invention;

Figure 11 is an isometric view of a rear supporting roll used on the embodiment of Figure 10;

Figure 12 is a diagrammatic side view of a third embodiment of the invention;

Figure 13 is a plan view of a portion of the embodiment of Figure 12 illustrating primarily the drive mechanism therefor;

Figure 14 is a partial side elevation of the structure illustrated in Figure 13; and Figure 15 is a section taken at line 15—15 of Figure 13.

Figure 1:
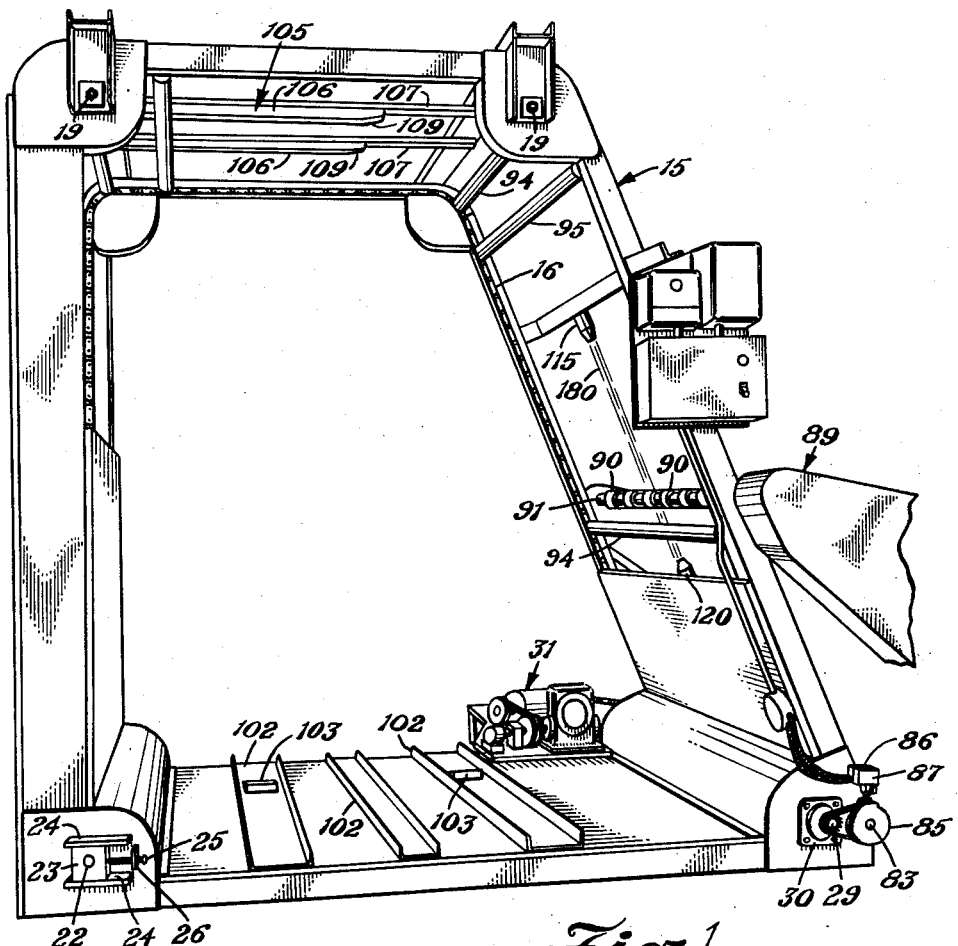
Figure 1 is an isometric view of an embodiment of the invention.
Figure 2:
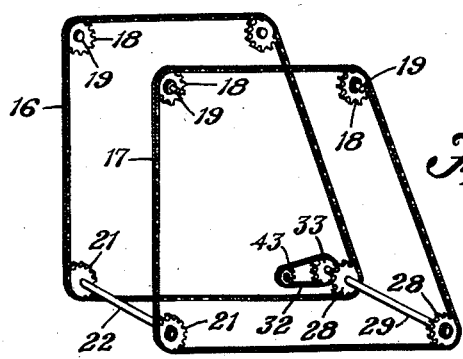
Figure 2 is an isometric view of the two supporting chains and mounting therefor used in the embodiment of Figure 1.

Referring to Figure 1, a frame, generally 15, is employed as the main support for the stacker. On this frame are mounted endless means trained for movement around a predetermined path and comprising a pair of roller chains 16 and 17. Referring particularly to Figure 2, chain 17 is at the upper, generally horizontal, run thereof supported on a pair of sprockets 18 rotatably mounted on stub shafts 19 secured to frame 15. Chain 16 is similarly mounted on a corresponding pair of sprockets 18.

One end of the lower run of chains 16 and 17 is held on sprockets 21 rotatably mounted on shaft 22. Shaft 22 extends through the sides of the frame and at each end is mounted in blocks 23 slidably supported in ways 24. A bolt 25 threaded through a projecting flange 26 serves to adjust the position of blocks 23 in ways 24 and thus regulate the tension on chains 16 and 17. The other end of the bottom run of the chains passes over a pair of sprockets 28 secured to shaft 29. Shaft 29 is carried in bearings 30 attached to frame 15 and is driven from the power means generally 31 by a chain 32 passing over sprocket 33 attached to shaft 29.

Figure 7:
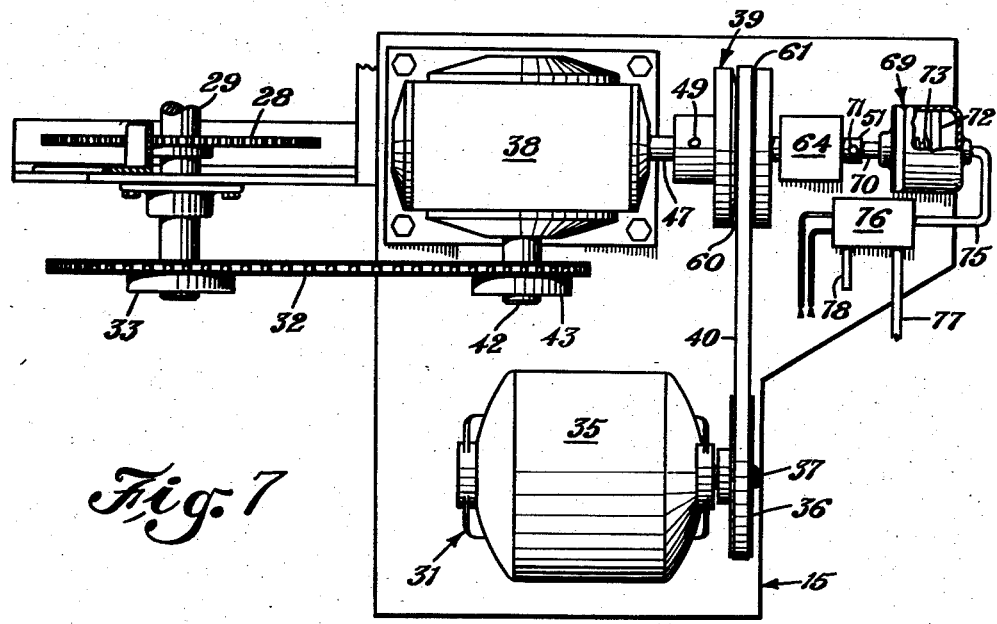
Figure 7 is a plan view of a portion of the drive means.
Figure 8:
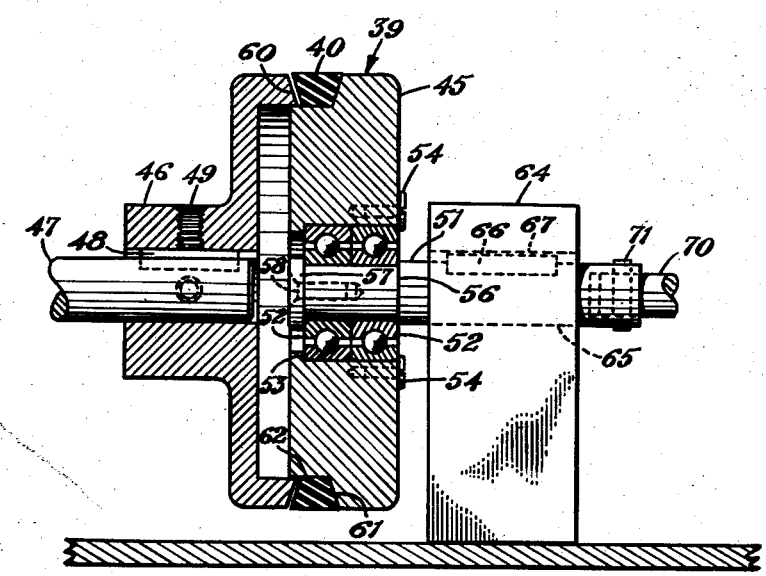
Figure 8 is a transverse section through the clutch of the drive means.

Power means 31 is best illustrated in Figure 7. An electric motor generally 35 has a V-belt pulley 36 secured to the output shaft 37 thereof. Pulley 36 drives a speed reducer 38 through a clutch 39 and a V-belt 40. The output shaft 42 of the speed reducer 38 has a sprocket 43 mounted thereon to drive chain 32.

Clutch 39 comprises an idler member 45 and a drive member 46. The drive member 46 is attached to the input shaft 47 of speed reducer 38 by means of a key 48 and set screws 49. Idler member 45 is supported on a shaft 51 by a pair of ball bearings 52. The bearings are held between an inner shoulder 53 on idler member 45 and screws 54 threaded into the idler member. The bearings 52 are held on shaft 51 between an external shoulder 56 on the shaft and a washer 57 attached to the end of the shaft by a screw 58. Drive member 46 has a drive face 60, beveled at the same angle as the V-belt 40, while idler member 45 has a corresponding beveled face 61. Idler member 45 has a cylindrical supporting surface 62 for the belt 40.

Shaft 51 is mounted in a support bearing 64 forming a part of frame 15. The opening 65 through which the shaft 51 passes is sufficiently large to permit movement of the shaft within the bearing but the shaft is held against rotation by a key 66 press fitted into shaft 51 and received in a slot 67 in bearing 64.

An air actuating cylinder generally 69 mounted on frame 15 has the piston rod 70 attached to shaft 51 by means of a pin 71. Air cylinder 69 includes a piston 72 attached to piston rod 70 with the piston being urged to the relaxed position (to the right in Figure 7) by a spring 73. A pipe 75 connects air cylinder 69 to a solenoid operated 3-way valve 76. From valve 76 a pipe 77 connects to a suitable source of air pressure. Pipe 78 is an exhaust line.

Referring to Figures 1 and 4, at the opposite end of shaft 29 from the drive mechanism is attached a sprocket 80 which is connected by a chain 81 to a sprocket 82 in which is journaled a stub shaft 83. Attached to sprocket 82 and rotatably mounted on shaft 83 are a pair of cams 84 and 85 on which ride the actuating members of a pair of snap-action switches 86 and 87. The switches are of the type commonly sold under the trade mark "Microswitch." As will be apparent from subsequent description herein, cams 84 and 85 are driven through one revolution for the picking up of each sheet of leather from the conveyor generally 89.

Conveyor 89 is an example of a type of conveyor for use with which the invention was devised. In the illustrated embodiment it comprises a plurality of belts 90 mounted on suitable supporting rollers such as the one illustrated at 91. The specific details of conveyor 89 form no part of the present invention and the structure of the conveyor is not further described inasmuch as it is entirely conventional.

A plurality of carrying members are mounted between chains 16 and 17. In the illustrated embodiment each of the carrying members comprise a first roller 94 and a second, or trailing, roller 95. As will be seen in Figures 5 and 6, each end of the rollers 94 and 95 have an end block 96 in which is journaled a pin 97 attached to chains 16 and 17. Means are provided to eliminate the tendency of the leather to fall off the supporting members as a result of uneven weight distribution of the leather on the supporting members. In the illustrated embodiment this is accomplished by weighting rollers 94 with a weight 98 secured to the inner portion of one side of the roller by screws 99. The weight 98 causes the roller 94 to resist rotation thereof and thus prevent the sheet of leather from causing the rollers to rotate with the leather falling off at a time when this is not desired.

In the embodiment illustrated in Figure 1, it is intended to load the sides of leather onto a wheeled horse generally 101. Therefore, three tracks are provided across the base of frame 15 by channels 102. Two of the channels have stops 103 which in conjunction with the channels serve to always position the horse 101 at a given place within frame 15.

Extending over the place where the leather is to be unloaded as represented by the position of horse 101 is a sheet releasing means generally 105. In the illustrated embodiment the sheet releasing means comprises a pair of felt pads 106 attached to supporting members 107 forming a part of frame 15. The bottom of pads 106 is at such a height that it will firmly contact the top of the side of leather 108 as the side of leather is moved past the pads 106 by the rollers 94 and 95, and because of this the entering end of the pads 106 is beveled upwardly as seen at 109. The positioning of pads 106 is one of the factors in determining the place at which the side of leather 108 will be deposited and to facilitate using the invention it is desirable that the pads 106 be adjustably mounted on supporting members 107 to permit moving the pad longitudinally thereof.

Figure 9:
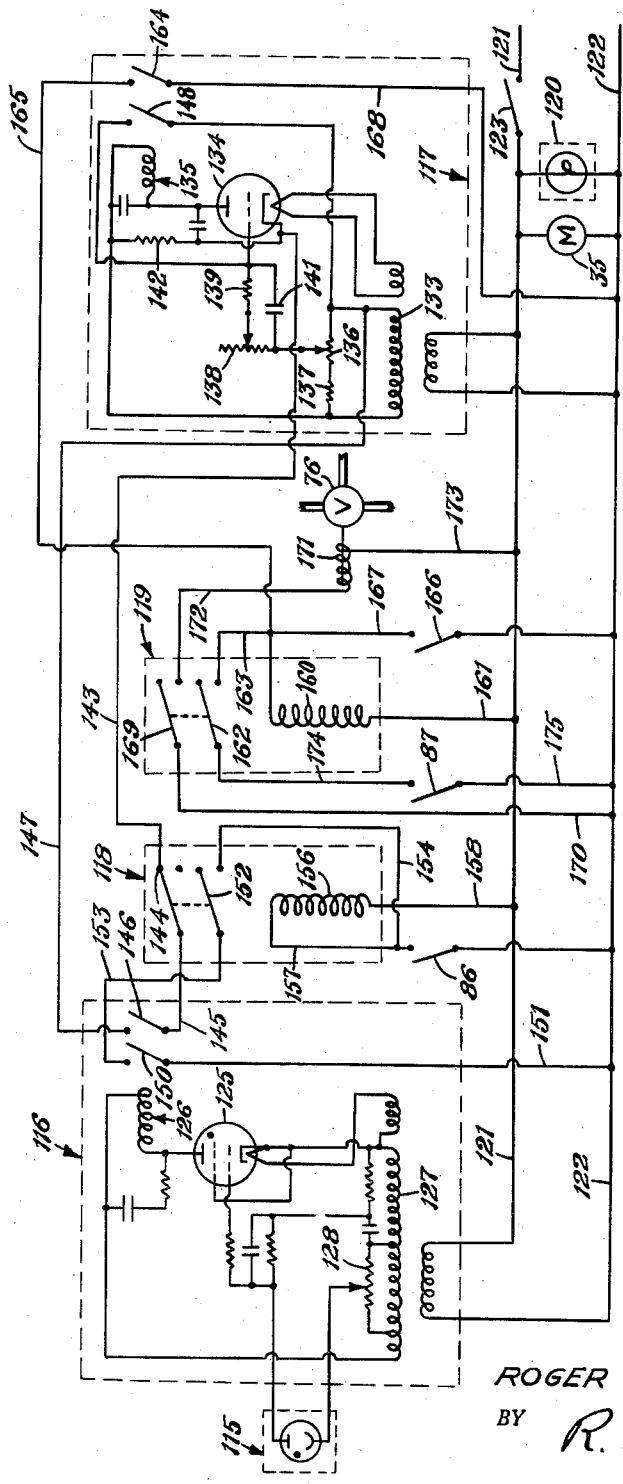
Figure 9 is a schematic wiring diagram.

The control means for the power means 31 is illustrated diagrammatically in Figure 9. It comprises generally the following units: a sheet sensing means including an electric eye 115, electric eye control means generally 116, and a light source 120; a time delay means generally 117; and a pair of relays generally 118 and 119. A pair of wires 121 and 122 are connected to a suitable source of electric power. A switch 123 in line 121 is used as a main control to energize and de-energize the control apparatus. The light source 120 for the electric eye is connected across lines 121 and 122 as is the main driving motor 35.

The electric eye 115 and the control means therefor are of a type sold by General Electric bearing their catalog No. CR7505–K100G3. The photoelectric tube 115 is a 923 phototube which controls the operation of tube 125, a 2051 thyratron, which in turn actuates relay generally 126 connected in the plate circuit of tube 125. The electric eye control means 116 is energized by a transformer 127, the primary of which is connected across feed lines 121 and 122. A potentiometer 128 connected across a pair of taps on transformer 127 and to the photoelectric eye 115 is used as a light level control. The other side of the photoelectric tube 115 is connected to the grid circuit of the thyratron 125. When a light beam is falling on eye 115 the grid of tube 125 is maintained negative so that current is not flowing therethrough. Upon the light being cut off tube 125 is rendered conductive.

The time delay relay 117 is likewise a commercial unit sold by General Electric under their catalog No. CR7504–A142. It is energized by a transformer 133, the primary of which is connected across feed lines 121 and 122. It comprises a tube 134 having a relay generally 135 connected in the plate circuit thereof. A potentiometer 136 together with a dropping resistance 137 is connected across the high voltage secondary of transformer 133 with the variable contact of potentiometer 136 connected to a rheostat 138. A resistance 139 connects the variable contact of rheostat 138 to the grid of tube 134. A condenser 141 is connected across resistance 139 and rheostat 138. A resistance 142 is connected from the cathode of tube 134 to the high voltage side of transformer 133. A wire 143 connects the cathode of tube 134 to the normally closed contact 144 of relay 118 with the other side of normally closed contact 144 being connected by a wire 145 to a normally open contact 146 of relay 126 in control means 116. The other side of normally open contact 146 is connected by a wire 147 to the low voltage end of transformer 133 and potentiometer 136 which point is also connected to normally open contacts 148 of relay 135. The other sides of normally open contacts 148 are connected to the grid of tube 134.

Normally open contact 150 of relay 126 in the control means 116 is connected to line 122 by a wire 151 and to the normally open contact 152 of relay 118 by a wire 153. The other side of normally open contact 152 is connected by a wire 154 to switch 86, which switch is also connected to lead 122. Switch 86 is connected to actuating coil 156 of relay 118 by a wire 157. The other side of coil 156 is connected to lead 121 by a wire 158.

Coil 160 of relay 119 has one side thereof connected to the line 121 by a wire 161 and the other side is connected to a normally open contact 162 of that relay by a wire 163, to normally open contact 164 of relay 135 in time delay means 117 by a wire 165 and to a momentary contact, normally open, switch 166 by a wire 167. The other side of contact 164 of relay 135 is connected to lead 122 by a wire 168. Normally open contact 169 of relay 119 is connected to line 122 by a wire 170 and to the solenoid 171 of valve 76 by a wire 172. The other side of solenoid 171 connects to line 121 by a wire 173. Contact 162 of relay 119 connects to normally closed switch 87 by a wire 174 with the other side of switch 87 being connected to line 122 by a wire 175.

As is seen in Figures 1 and 3, the light source 120 is positioned at one side of conveyor 89 with the electric eye 115 being positioned at the opposite side. The beam of light 180 passes through one of the spaces between belts 90. In some embodiments, particularly where the sheets carried by conveyor 89 are relatively narrow in width and may be variably positioned on conveyor 89 or where the sheets may have occasional openings through which a single light beam might pass, it might be found to be desirable to position both the electric eye 115 and the light source 120 on the same side of conveyor 89 with a mirror on the opposite side to reflect the light beam from one to the other.

To start the apparatus, switch 123 is closed to energize the light source 120, motor 35 and the leads to the various components of the control means. While motor 35 is energized and running the speed reducer is not being driven because spring 73 holds idling member 45 in the retracted position and this idling member merely rotates on shaft 51. At this point one pair of the carrying members, comprising rollers 94 and 95, are positioned immediately adjacent the discharge end of conveyor 89 on the generally vertical run 181 of the path of the carrying members as they are carried along by chains 16 and 17 (see Figure 3). The generally vertical run 181 is followed by a generally horizontal run 182 which passes across over the place in which the sheets are to be deposited. It is along this run that the sheet releasing means 105 is positioned.

As a side of leather 108 approaches the end of conveyor 89 it intercepts the beam of light 180 to actuate thyratron 125 and energize relay 126 of the photoelectric control means 116. The closing of contacts 146 of relay 126 completes a circuit from the cathode of tube 134 of time delay means 117 through wire 143, normally closed contacts 144 of relay 118, wire 145, contacts 146, wire 147, to the low voltage side of transformer 133 and potentiometer 136.

During the period of time preceding the closing of these contacts the cathode and grid of tube 134 acted as a rectifier to charge condenser 141. The amount of this charge is controlled by the adjustment of potentiometer 136. This charge on condenser 141 maintains a negative potential on the grid of tube 134 and prevents the passage of current to the plate thereof. Upon the closing of the previously described circuit by contacts 146 the charge on condenser 141 is dissipated through the resistance 139 and the rheostat 138. The length of time, delay period, that it takes for this charge to be dissipated is controlled by the adjustment of rheostat 138. When the charge is dissipated the grid of tube 134 is no longer negative and current will flow across the tube from the cathode to the plate, which current will actuate relay 135. The delay period is adjusted so as to permit the leading edge of the sheet of leather 108(a) that cut the light beam to travel the desired distance over rollers 94 and 95 and to hang down thereover as illustrated at the right hand side of Figure 3.

The contacts 148 of relay 135 provide a locking circuit to prevent any vibration of the contacts caused by line voltage fluctuations or the like. Contact 164 of relay 135 closes a circuit from line 122 through wire 168, wire 165, the coil 160 of relay 119 and wire 161 to line 121 which actuates relay 119. The closing of contact 162 of relay 119 forms a holding circuit through coil 160 by connection 163, wire 174, switch 87 and wire 175. The closing of contacts 169 of the same relay completes a circuit from line 122 through wire 170, contacts 169, wire 172, solenoid 171 of valve 76 and wire 173 to line 121. This actuates valve 76 to apply air pressure from pipe 77 through pipe 75 to air cylinder 69. The air pressure pushes piston 72 to the left in Figure 7 and binds belt 40 between the opposed faces 60 and 61 of idler member 45 and drive member 46, respectively. The clutch 39 then commences to drive speed reducer 38 and the stacking apparatus. Chains 16 and 17 are moved upwardly along run 181 raising rollers 94 and 95 to pick up the sheet of leather 108(a) that is coming off of conveyor 89. The sheet of leather is moved towards the position of the sheet shown at 108(b).

During the period of rotation of shaft 29 by the power means, the cams 84 and 85 are rotated to actuate switches 86 and 87. Switch 86 is first closed momentarily to energize coil 156 of relay 118. Since the light beam is still cut at that time to energize relay 126 of photoelectric control means 116, a circuit is completed from line 122 through wire 151, contacts 150, wire 153, contact 152, wire 157, coil 156, and wire 158 to line 121. This is a holding circuit for relay 118. The holding of relay 118 in the actuated position breaks the circuit from contacts 146 of control means 116 to the time delay means 117 and permits condenser 141 of the time delay means to be recharged. Thus the circuit from the photoelectric control means 116 to the time delay means 117 will remain broken as long as the light beam 180 is cut which prevents the stacker from continuing to run after the end of a cycle in the event that the beam of light has not been re-established but has remained broken before that time.

As the stacker reaches the end of a cycle, cam 85 momentarily opens normally closed switch 87, breaking the holding circuit through coil 160 and releasing the contacts of relay 119. The opening of the circuit through solenoid 171 through contacts 169 of relay 119 cause solenoid valve 76 to change position and release the air pressure from cylinder 69 through exhaust pipe 78. Spring 73 of cylinder 69 moves piston rod 70 and shaft 51 to the right, disengaging belt 40 from between the two faces 60 and 61 of clutch 39. The drag of chains 16 and 17 together with that of speed reducer 38 acts as a brake to almost immediately stop the movement of rollers 94 and 95. If desired, supplementary braking means may be provided, but it has been found in practice that this drag is sufficient to obtain substantially instantaneous stopping of the mechanism upon the disengagement of clutch 39. If by that time the side of leather has been lifted to position 108(b) and the light beam 180 re-established, relay 126 has relaxed to break the holding circuit through contact 150 of relay 126 and to allow relay 118 to return to the position illustrated in Figure 9. The next pair of rollers 94 and 95 have also reached the position at the end of conveyor 89 as illustrated in Figure 3.

The cycle will then be recommenced upon the new cutting of the light beam 180 by a following side of leather 108 coming along conveyor 89. As a matter of fact, if the light beam was re-established before the completion of the cycle, relay 118 will have been relaxed as just described. A subsequent side of leather coming along conveyor 89 can then reactuate relay 126 of control means 116 to effect a circuit through contacts 146 of that relay, contacts 144 of relay 118 to initiate the operation of the time delay means 117. This will occur even though relay 119 remains energized as a result of the non-completion of the existing cycle. The time delay of means 117 will be sufficiently long so that the power means will have reached the end of a cycle as determined by the position of cam 85 before relay 135 of the time delay means 117 is re-energized at the end of the time delay period initiated by the following side of leather. Thus the second cycle may be ready to start almost immediately upon the completion of the first cycle if the sides of leather are traveling close together along conveyor 89.

When the carrying members move away from the position identified by side 108(b) in Figure 3, that side of leather reaches the sheet releasing means 105. The trailing edge of the side of the leather lays along the right hand side of the horse 101 as seen with the sheets that are already on the horse in Figure 3. The leading edge of the side is pulled across the top of the horse and as the top of the side of leather contacts the pad 106 the friction between the leather and the pad prevents any further movement of the leather with the rollers rolling out from under the side of leather as they move forward (to the left) along the generally horizontal run 182. At the end of this cycle the side of leather is in the position illustrated by the side of leather 108(c). During the subsequent cycle the rollers move on down the remaining vertical run 183 with the original leading edge of the side of leather 108(c) falling down onto the left hand side of horse 101.

If at any time it is desired to go through a cycle with the light beam 180 being uninterrupted, this can be done by momentarily closing switch 166 which will pick up relay 119 and cause the machine to go through a cycle. The cycle will be completed in the usual manner by the momentary breaking of switch 87. This may occur at the end of a day's run when sides of leather are in the position as illustrated at 108(b) and 108(c) with no further sides of leather coming off of conveyor 89. The switch may be pressed to initiate several further cycles to unload all of the sides of leather from the stacker.

Various modifications of this invention will be apparent to those skilled in the art and such modifications are deemed to be within the scope of the invention to the extent that they are not excluded by the terms of the appended claims. For example, the specific angle of run 181 with respect to the vertical and the angle of run 182 with respect to the horizontal will be subject to substantial variation over those specifically illustrated in the drawings. The terms "generally vertical" and "generally horizontal" have been used with respect to these runs to indicate the fact that substantial variations are within the scope of the present invention. The specific number of rollers employed in a "carrying member" may be varied depending upon the dimensions and characteristics of the sheet being handled.

It will also be apparent that when the sheets of leather are moving along conveyor 89 in a predetermined timed relationship that the intermittent movement of the carrying members as represented by rollers 94 and 95 may be eliminated with these carrying members moving continuously and in timed relationship to the movement of the sheets on conveyor 89. Thus the carrying members would arrive at the position to pick up a sheet as shown at the right-hand side of Figure 3 at the time when the sheet was in proper position for being picked up by being received from conveyor 89. While such a modification will be apparent and could be used in some applications, the importance of the control means in the present invention should not be overlooked. The described embodiment was devised for use in an application where it was not feasible to have the sheets in timed relationship on conveyor 89. The control means eliminates this necessity and yet the stacker will operate as fast as the sheets are moved along conveyor 89 as long as there is a brief break between each sheet for the re-establishment of light beam 180 as previously described. The extent of that break and thus the timing of the sheets on conveyor 89 is unimportant.

In the illustrated embodiment the normal restraining of the rollers 94 against rotation by means such as weights 98 is a particularly important feature of the invention. However, in certain applications this could be eliminated. For example, if the sheets were of very light weight such that the normal friction of the rollers 94 and 95 on the mounting pins 97 would provide sufficient restraining action it would not be necessary to use additional means for this purpose. In some cases the sheets could be sufficiently evenly balanced on the rollers by the adjustment of the control means so that there would be little or no tendency for the sheets to move one way or the other. However, we have found that the stacking of sides of leather is better accomplished when the leading edge of the side does not hang over the rollers as far as does the trailing edge. An additional advantage of this lies in the fact that the height of the pick up point, as represented by the discharge end of conveyor 89, need not be as high from the floor or the bottom of frame 15 as would be necessary if the sides of leather were evenly balanced over the rollers.

Several other variations are illustrated in the embodiment of Figure 10. This embodiment was devised for the purpose of laying sheets out flat on a table or on a flat topped cart such as the cart illustrated at 190. This cart is supported on a platform 191 forming a part of frame 15 and having chocks 192 to use in positioning the cart at a predetermined point on the platform. In this particular embodiment the sheets 108' are received by the stacker from a conveyor 89'.

Here a light source 120' and the photo electric eye 115' are positioned so that the light beam 180' will be cut at about the instant the sheet 108'(a) is in proper position on the carrying members as shown by the two rollers 94' and 95' at the right-hand side of Figure 10. With this positioning of light beam 180' the time delay means 117 is eliminated from the control means with contacts 146 being connected to relay 119 in place of the contacts 164 of control means 117. Actually, of course, there still will be a small time delay in the starting of the movement of the carrying members of the stacker but this delay will be extremely short as only representing the actuating time of the various components. The apparatus should be timed and positioned so that the trailing edge of a sheet will not fall down and cut the light beam a second time to restart the stacker after the completion of the cycle at the commencement of which the light beam was cut by the leading edge of that same sheet.

The positioning of the electric eye illustrated in Figure 10 and the elimination of the variable time delay will not provide the ability to adjust the position of the sheet 108'(a) on the supporting members independent of the movement of conveyor 89' or the line of light beam 180' such as is accomplished with the control means illustrated in Figure 9. It will be remembered that in Figure 9 by adjusting the charge on capacitor 141 and the rate of discharge thereof the time delay may be varied which will vary the positioning of the sheet on the carrying members. If this feature is needed, as it is in many cases, the electric eye for the embodiment in Figure 10 may be positioned as illustrated in Figure 3, with the use of the full control means illustrated in Figure 9.

As the carrying members move up the generally vertical run 181' and out onto the generally horizontal run 182' the leading and trailing edges of the sheet pass over a supporting means formed by roll 194. Roll 194 is mounted on a shaft 195 suitably journaled in arms 196 forming a part of frame 15. A sprocket 197 is also attached to shaft 195 and is driven by a chain 198 from a sprocket 199. Sprocket 199 is attached to one of sprockets 18' and like sprocket 18 is rotatably supported on a stub shaft 19'. Sprocket 18' and shaft 19' correspond to the sprocket 18 and shaft 19 on the embodiment illustrated in Figures 1 and 2. Thus the movement of chain 17' about sprocket 18' drives sprocket 199, sprocket 197 and roll 194. This moves sheet 108'(b) across roll 194 without any drag on the carrying members for the side of leather. Roll 194 prevents the trailing edge of the sheet of leather from dragging over and rolling up the trailing edges of the sheets already on the cart.

When the side reaches the end of the first, or pick up, cycle, as illustrated by the position of sheet 108'(b), the leading edge of the side has fallen away from roll 194 while the trailing edge is still held out by the supporting means as represented by roll 194. During the course of the following cycle the sheet 108'(b) continues to move to the left along run 182' and eventually the trailing edge of this sheet falls off of roll 194 and down onto the top of car 190. Also during this same cycle the top of the sheet 108'(b) frictionally engages pads 106' with the rolls continuing to move out from under the sheet by rolling along the bottom side of the sheet. At the end of this cycle the carrying members have reached the position just to the left of the pad 106', as seen in Figure 10, and the sheet has completely fallen down onto the top of cart 190 as illustrated by the position of the sheet 108'(c).

From the foregoing description the versatility of the use of the present invention which is one of its particular features and advantages will become readily apparent. The path of movement of the supporting members as illustrated by runs 181 and 182 may be substantially varied to meet different problems in the stacking of sheets received from a conveyor. The sheets may be stacked on various types of supporting means, varying as widely as does the horse 101 vary from the cart 190. Of course, the stacking may be done on tables or even on transverse conveyors. The positioning of the sheet with respect to a particular place upon which the sheets are to be stacked may be varied by varying the position of pad 106 or by varying the position of the sheets on the carrying members as represented by rollers 94 and 95. It will be remembered that the position of the sheet on the carrying members is changed by varying the time delay either as to the extent of charge of condenser 141 or the rate of discharge thereof.

Referring to Figures 12–15, there is here illustrated an embodiment devised for transporting the sides of leather 220 through a drier 221. The embodiment comprises a first pair of spaced chains 222 mounted on sprockets 223. As will be seen in Figure 12, the positioning of chains 222 is such as to give the chains a generally vertical run passing immediately adjacent the end of a conveyor generally 224. A second pair of spaced chains 225 are employed mounted on a plurality of sprockets 226 and being positioned so as to have a generally horizontal run commencing immediately adjacent the upper end of the generally vertical run of chains 222.

A plurality of carrying members generally 228 (Figure 15) are employed which take the form of a roller 229 used to support the side of leather and having an axle 230 extending from each end thereof. At one end of axle 230 an anti-rotating member 231 passes through the axle and is secured thereto. The exact shape of this anti-rotating member 231 is relatively unimportant, the important thing being that it forms projections from the axle 230. In the illustrated embodiment the anti-rotating member 231 takes the form of a pin through the axle.

Referring again to Figure 12, chains 222 have two pairs of fingers 233 attached thereto and projecting outwardly away from the chains at right angles. Fingers 233 are mounted in pairs, with one being on each of chains 222 and positioned opposite each other so as to form supporting members for the carrying members 228. Similarly, supporting members are mounted in pairs on chains 225, where the supporting members take the form of cradles 234 attached to chains 225 by the pins 235 that hold the links of the chains 225 together.

As supporting members 233 move upwardly along the generally vertical run of chains 222, a carrying member 228 will be picked up by the axles 230 from a platform 237 on which the roller 229 is resting. Supporting members 233 pass beyond the ends of the platform 237 and engage the axle 230 of carrying member 228. Anti-rotating guides 238 are positioned to contact pin 231 to prevent the roller from rotating as it is moved upwardly by supporting members 233 along the generally vertical run of chains 222. Upon reaching the upper end of that run the carrying member slides down guide members 239 positioned to contact axles 230 to be picked up by supporting members 234 on chains 225. One of guide members 239 also contacts pin 231 to prevent the carrying members from rotating. Along the generally horizontal run of chains 225 is an anti-rotating guide 240 (Figure 15) which terminates just prior to the entering end of sheet releasing pad 241 (Figure 12). As in the previous embodiments, this pad is positioned to unroll the sides of leather 220 from about the carrying members 228 to deposit the sides of leather on horse 101. The carrying members continue on around the chain 225, being held in place by a guide 242 and upon reaching the other end of the machine guide 242 terminates with the carrying members rolling off on platform 237 to be picked up again by supporting members 233 on chains 222.

The drive means for the pairs of chains 222 and 225 is illustrated in Figure 13. As will be seen in this view, the upper sprockets 223 that support chains 222 are mounted on shafts 245. Each of shafts 245 is rotatably carried in pillow blocks 246 with a gear 247 being attached to the opposite ends of shafts 245. Each of gears 247 engages a gear 248 on a shaft 249 suitably journaled in pillow blocks 246. At one end of shaft 249 a coupling 251 connects shaft 249 to the output shaft 252 of right angle speed reducer 253. The input shaft 254 of speed reducer 253 is connected by a coupling 255 to a motor 256.

The opposite end of output shaft 252 carries a sprocket 258 connected by a chain 259 to a sprocket 260 attached to shaft 261. Shaft 261 is journaled in bearings 262 with an arm 263 attached to the other end of the shaft. A drive member 265 is attached to the end of arm 263 and engages slotted drive members 266 on wheel 267. Wheel 267 is secured to shaft 268 journaled in pillow blocks 246 and carrying a pair of gears 269. Immediately below shaft 268 are a pair of shafts 271 rotatably mounted in pillow blocks 246 with each shaft carrying a gear 272, which two gears engage the two gears 269 on shaft 268. At the opposite end of each of shafts 271 is one of the gears 226 that carry chains 225.

On the end of shaft 261 are a pair of cams 84' and 85' to actuate snap action switches 86' and 87', respectively. The cams 84' and 85' and the switches 86' and 87' correspond in structure and operation to the cams 84 and 85 and switches 86 and 87 illustrated and described in connection with the embodiment of Figure 1.

The electrical circuit for operating the embodiment of Figures 12–15 is the same as that shown in Figure 9 except that as described in connection with Figures 12–15, no clutch was employed. Therefore, instead of having solenoid 171 in Figure 9 operate the valve to control the clutch, it operates a relay to energize motor 256 in a conventional manner. A side of leather proceeding along conveyor means 224 cuts the beam between light source 120' and electric eye 115' to actuate the control means illustrated in Figure 9. After the desired time delay, motor 256 is energized through the relay operated by coil 171 and starts the movement of supporting fingers 223 upwardly to pick up a carrying member 228 to lift the side of leather from conveyor means 224. At the same time the Geneva drive represented by members 263 and 267 and the associated parts moves chain 225 and the carrying members already supported thereon in a direction through drier 221 towards horse 101. As the carrying member 223 passes up through guides 238 it is prevented from rotating by these guides and similarly as it slides down guides 239 to be received in carrying members 234. About this time cam 85' momentarily opens normally closed switch 87' to de-energize the motor 256 as previously described in connection with the embodiment of Figure 1. At the end of a day's run when no further sides of leather are being fed along conveyor 224, the sides hanging through the space occupied by the drier may be cleaned out by closing switch 166 to keep the apparatus running until all the sides have gone through the drier and are stacked on horse 101.

The foregoing description is for the purpose of complying with 35 USC 112, and I do not desire to be limited to the exact details shown and described, for obvious modifications will be apparent to those skilled in the art to which this most nearly appertains, and such modifications may be made without departing from the spirit of the invention.

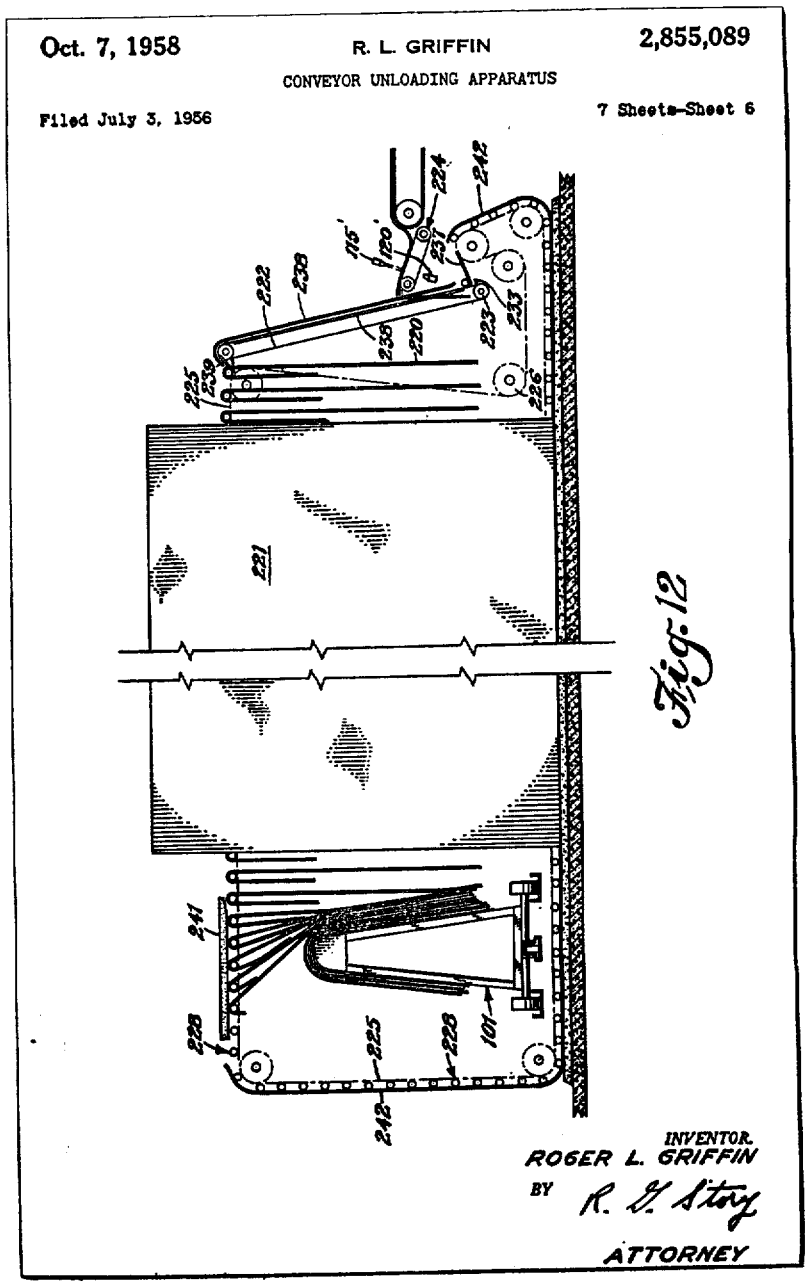

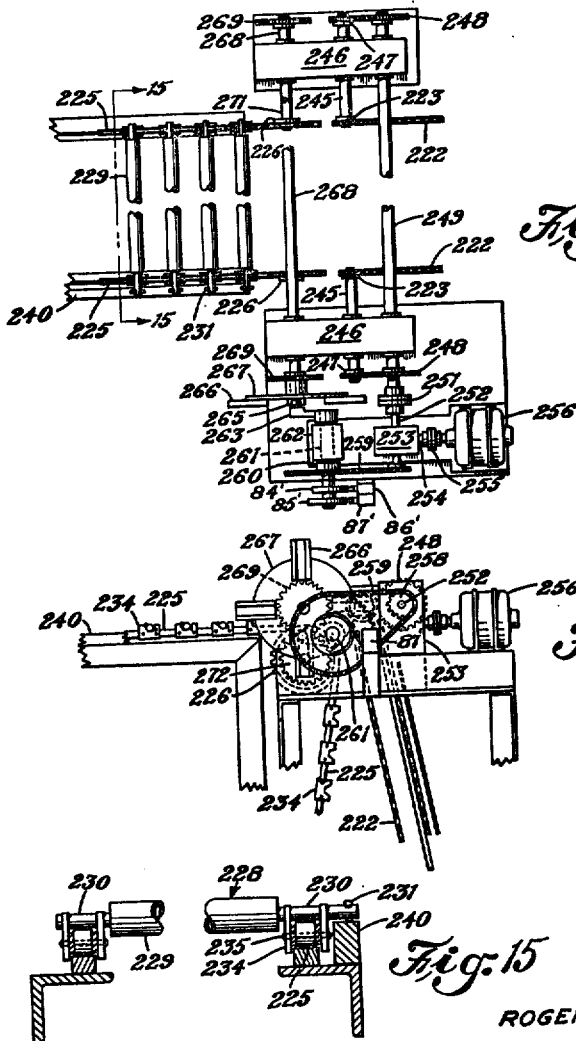

I claim:

1. A device for removing sheets of material from a conveyor and depositing said sheets, said device comprising a frame, a carrying member, endless means mounted on said frame to move said carrying member along a predetermined path from a first point at the discharge end of said conveyor, at which point said conveyor will loop a sheet over said member, said member being rotatable with respect to said endless means, means associated with said member along a first portion of said path in said direction from said first point to restrain the rotation of the member with respect to said endless means whereby the weight of a sheet will not cause the member to so rotate, drive means connected to said endless means to move said member in a predetermined direction, and releasing means positioned along a second portion of said path in said direction from said first portion to rotate said member with respect to said endless means thereby unlooping said sheet from about said member as said member moves along said portion of said path to deposit said sheet below said second portion of said path.

2. A device for removing sheets of material from a conveyor and depositing said sheets, said device comprising a frame, a roller, endless means mounted on said frame to move said roller along a predetermined path from a first point at the discharge end of said conveyor, at which point said conveyor will loop a sheet over said roller, said roller being rotatably supported on said endless means, said roller being weighted on one side thereof thereby increasing the force necessary to rotate said roller, drive means connected to said endless means to move said roller in a predetermined direction, and releasing means positioned along a portion of said path in said direction from said first point to rotate said roller and gradually unloop said sheet from about said roller as said roller moves along said portion of said path.

3. A device for removing sheets of material from a conveyor and depositing said sheets, said device comprising a frame, endless means mounted on said frame, said means being positioned on said frame to have one generally vertical run and an adjacent generally horizontal run, said generally vertical run being positioned across the discharge end of said conveyor, a roller rotatably supported horizontally on said endless means for movement thereby along said runs, drive means connected to said endless means to move said roller sequentially from a point on said generally vertical run at which point a sheet from said conveyor will be looped over said roller upwardly to said generally horizontal run, and a pad mounted on said frame and positioned immediately above the roller along said horizontal run to cause said roller to rotate and unroll said sheet from about said roller as said roller moves along said horizontal run under the pad.

4. A device for removing sheets of material from a conveyor and depositing said sheets at a given place, said device comprising a frame, a pair of spaced endless means mounted on said frame, said means being positioned on said frame to have a first pair of generally vertical runs and a second pair of adjacent generally horizontal runs, said horizontal runs being above and at each side of said place, said first runs being inclined upwardly from the horizontal, a pair of rollers rotatably supported on each of said spaced means and positioned therebetween, at least the first of said rollers having means associated therewith to restrain the rotatability of the rollers whereby the weight of a sheet will not cause it to revolve, power means connected to said endless means to move said rollers sequentially from said first to said second runs, said first run being positioned to cause the roller to pass the end of the conveyor in moving toward the second run whereby a sheet from said conveyor will be draped over said rollers as said rollers traverse said first run, and a pad mounted on said frame and positioned immediately above the rollers along said horizontal run to contact the sheet overlying said rollers to unroll said sheet from about said rollers as said rollers move along said horizontal run under the pad.

5. A device for removing sheets of material from a conveyor and depositing said sheets, said device comprising a frame, endless means mounted on said frame, said means being positioned on said frame to have one generally vertical run and an adjacent generally horizontal run, said generally vertical run being positioned at the discharge end of said conveyor, a carrying member supported on said endless means for movement thereby along said runs, power means connected to said endless means to move said member from said first to said second run, control means operatively connected to said power means to stop the movement of said endless means when said member is immediately adjacent the end of said conveyor in a position that a sheet from said conveyor will pass over said member and to start the movement of said member toward said second run when a sheet has passed over said member a predetermined amount whereby said member will pick up the sheet with the sheet looped over the member, and releasing means positioned along a portion of said generally horizontal run to gradually unloop said sheet from about said member as said member moves along said portion of said run.

6. A device for removing sheets of material from a conveyor and depositing said sheets, said device comprising a frame, endless means mounted on said frame, said means being positioned on said frame to have one generally vertical run and an adjacent generally horizontal run, said generally vertical run being positioned at the discharge end of said conveyor, a carrying member supported on said endless means for movement thereby along said runs, drive means connected to said endless means to move said member from said first to said second run, control means operatively connected to said power means to stop the movement of said endless means when said member is immediately adjacent the end of said conveyor in a position that a sheet from said conveyor will pass over said member, said control means including an electric eye and a light source positioned for the beam from the source to the eye to be intercepted when a sheet reaches a given point in relation to said conveyor and to actuate said control means to start the movement of said member toward said second run a predetermined time after the interception of said beam whereby the sheet will pass over said member before said member is started and upon starting said member will pick up the sheet with the sheet looped over the member, and releasing means positioned along a portion of said generally horizontal run to gradually unloop said sheet from about said member as said member moves along said portion of said run.

7. A device for removing sheets of material from a conveyor and stacking said sheets at a given place, said device comprising a frame, a pair of spaced endless means mounted on said frame, said means being positioned on said frame to have a first pair of generally vertical runs and a second pair of adjacent generally horizontal runs, said generally vertical runs being positioned at the discharge end of said conveyor, said horizontal runs being above and at each side of said place, said first runs being inclined upwardly from the horizontal, a pair of rollers rotatably supported on each of said spaced means and positioned therebetween, at least the first of said pair of rollers having means associated therewith to restrain the rotatability of the rollers whereby the weight of a sheet will not cause it to revolve, power means connected to said endless means to move said rollers sequentially from said first to said second runs, control means operatively connected to said power means to stop the movement of said endless means when said rollers are immediately adjacent the end of said conveyor in a position that a sheet from said conveyor will pass over said rollers and to start the movement of said rollers toward said second runs when a sheet has passed over said rollers a predetermined amount whereby said rollers will pick up the sheet with the sheet looped over the rollers, and a pad mounted on said frame and positioned immediately above the rollers along said horizontal run to contact the sheet overlying said rollers to unroll said sheet from about said rollers as said rollers move along said horizontal run under the pad.

8. A device for removing sheets of material from a conveyor and stacking said sheets at a given place, said device comprising a frame, a plurality of carrying members, endless means mounted on said frame to move said carrying members along a predetermined path passing a first position at the end of said conveyor and moving to a second position above said place, drive means connected to said endless means to move said members in a predetermined direction, control means operatively connected to said drive means to stop the movement of said endless means when each of said members is immediately adjacent the end of said conveyor in a position that a sheet from said conveyor will pass over the member so positioned and to start the movement of the member with the sheet thereon toward said second position when a sheet has passed over the member whereby the member will pick up the sheet with the sheet looped over the member, and releasing means positioned above said place to gradually unloop the sheets from about said members as the members with the sheets looped thereover move across above said place.

9. A device for removing sheets of material from a conveyor and stacking said sheets at a given place, said device comprising a frame, a plurality of carrying members, endless means mounted on said frame to move said carrying members along a predetermined path passing a first position at the end of said conveyor and moving to a second position above said place, drive means connected to said endless means to move said members in a predetermined direction, control means operatively connected to said drive means to stop the movement of said endless means when each of said members is immediately adjacent the end of said conveyor in a position that a sheet from said conveyor will pass over the member so positioned and to start the movement of the member with the sheet thereon toward said second position, said control means including sensing means to be actuated when a sheet reaches a given point in relation to said conveyor and variable time delay means to start the movement of said endless means toward said second position an adjustable time after the actuation of said sensing means by a sheet whereby the extent to which a sheet will pass over the member so positioned before said member is started toward said second position may be varied, and releasing means positioned above said place to gradually unloop the sheets from about said members as the members with the sheets looped thereover move across above said place.

10. A device for removing sheets of material from a conveyor and stacking said sheets at a given place, said device comprising a frame, a plurality of carrying members, endless means mounted on said frame to move said carrying members along a predetermined path passing a first position at the end of said conveyor and moving to a second position above said place, drive means including a motor and a clutch connected to said endless means to move said members in a predetermined direction, control means operatively connected to said clutch to disengage the clutch to stop the movement of said endless means when each of said members is immediately adjacent the end of said conveyor in a position that a sheet from said conveyor will pass over the member so positioned and to engage the clutch to start the movement of the member with the sheet thereon toward said second position when a sheet has passed over the member whereby the member will pick up the sheet with the sheet looped over the member, and releasing means positioned above said place to gradually unloop the sheets from about said members as the members with the sheets looped thereover move across above said place.

11. A device for removing sheets of material from a conveyor and stacking said sheets at a given place, said device comprising a frame, a plurality of carrying members, endless means mounted on said frame to move said carrying members along a predetermined path passing a first position at the end of said conveyor and moving to a second position above said place, drive means including a motor and a clutch connected to said endless means to move said carrying means in a predetermined direction, a belt connecting said motor and said clutch, said clutch including an idling member and a coaxially positioned driving member, said idling member and said driving member having opposed pressure faces, actuating means to move one of said members axially toward and away from the other of said members, control means operatively connected to said actuating means to move said movable member away from the other member to disengage the clutch to stop the movement of said endless means when each of said supporting means is immediately adjacent the end of said conveyor in a position that a sheet from said conveyor will pass over the supporting means so positioned and to move said movable member toward said other member to engage the belt between said pressure faces to start the movement of the supporting means with the sheet thereon toward said second position when a sheet has passed over the carrying means a predetermined amount whereby the carrying means will pick up the sheet with the sheet looped over the carrying means, said clutch including means to support said belt, and releasing means positioned above said place to gradually unloop the sheets from about said carrying means as the carrying means with the sheets looped thereover moves across above said place.

12. A device for removing sheets of material from a conveyor and stacking said sheets, said device comprising a frame, endless means mounted on said frame, said means being positioned on said frame to have one generally vertical run and an adjacent generally horizontal run, said generally vertical run being positioned at the discharge end of said conveyor, a carrying member supported on said endless means for movement thereby along said runs, drive means connected to said endless means to move said carrying member sequentially from a point on said generally vertical run at which point a sheet from said conveyor will be looped over said carrying member upwardly to said generally horizontal run, a rotatable member positioned below the intersection of said generally vertical and said generally horizontal runs to support portions of said sheet as the sheets move away from said intersection across said horizontal run, and releasing means positioned along a portion of said generally horizontal run to gradually unloop said sheets from about said carrying member as said carrying member moves along said portion of said run.

13. A device for removing sheets of material from a conveyor and depositing said sheets at a given place, said device comprising a frame, a pair of spaced chains, a plurality of sprockets attached to said frame and supporting said chains along generally parallel paths in a position to have a first pair of generally vertical runs and a second pair of adjacent generally horizontal runs, said horizontal runs being above and at each side of said place, a carrying roller rotatably mounted on each of said chains and positioned therebetween, said roller having means associated therewith to restrain the rotatability of the roller whereby the weight of a sheet will not cause it to rotate, power means connected to at least two of said sprockets to move said roller sequentially from said first to said second runs, said first run being positioned to cause the roller to pass the end of the conveyor in moving toward said second run whereby a sheet from said conveyor will be draped over said roller as said roller traverses said first run, a supporting roll mounted below the intersection of said first and second runs and extending across at least part of the area between said spaced chains, said supporting roll being operatively connected to one of said chains to be rotated thereby, and a pad mounted on said frame and positioned immediately above the carrying roller along said horizontal run to contact the sheet overlying said roller to unroll said sheet from about said roller as said roller moves along said horizontal run under the pad.

14. A device for stacking sheets at a place, said device comprising a frame, endless means mounted on said frame, said means being positioned on said frame to have one generally vertical run and an adjacent generally horizontal run, a first portion of said generally horizontal run passing over said place, a carrying member rotatably supported on said endless means for movement thereby along said runs, drive means connected to said endless means to move said member in a given direction sequentially from a point on said generally vertical run to said generally horizontal run, feeding means to loop a sheet over said member at said point, means associated with said member along a second portion of said path between said point and said first portion in said direction from said point to restrain the rotation of the member with respect to said endless means whereby the weight of a sheet will not cause the member to so rotate, and releasing means positioned along said first portion of said generally horizontal run to rotate said member thereby gradually unlooping said sheet from about said member as said member moves along said first portion to deposit said sheet below said first portion.

15. A device for stacking sheets of material at a given place, said device comprising a frame, a plurality of carrying members, endless means mounted on said frame to move said carrying members along a predetermined path passing a first position at the end of said conveyor in a generally vertical run and moving to a second position above said place in a generally horizontal run, drive means connected to said endless means to move said members in a direction along said path to pass from said generally vertical run to said generally horizontal run, control means operatively connected to said drive means to stop the movement of said endless means when each of said members is at a point along said generally vertical run, feeding means to loop a sheet over the member stopped at said point, said control means including sensing means to start said endless means moving in said direction upon a sheet being looped over said member whereby said member will pick up the sheet with the sheet looped over the member, and releasing means positioned above said place to gradually unloop the sheets from about said members as said members with the sheets looped thereover move across said place.

16. A device for removing sheets of material from a conveyor and depositing said sheets at a given place, said device comprising a frame, a pair of spaced chains, a plurality of sprockets attached to said frame and supporting said chains along generally parallel paths in a position to have a first pair of generally vertical runs and a second pair of adjacent generally horizontal runs, said horizontal runs being above and at each side of said place, a carrying roller rotatably mounted on each of said chains and positioned therebetween, power means connected to at least two of said sprockets to move said roller sequentially from said first to said second runs, said first run being positioned to cause the roller to pass the end of the conveyor in moving toward said second run whereby a sheet from said conveyor will be draped over said roller as said roller traverses said first run, and releasing means positioned along a portion of said path along said horizontal run to unroll said sheet from about said roller as said roller moves along said horizontal run.

17. A device for removing sheets of material from a conveyor and depositing said sheets at a given place, said device including a frame, a first pair of spaced endless means mounted on said frame, said means being positioned on said frame to have one generally vertical run passing adjacent the discharge end of said conveyor, a second pair of spaced endless means mounted on said frame and positioned to have one generally horizontal run, one end of which passes adjacent the upper end of said generally horizontal run, a plurality of supporting means attached to said endless means, a plurality of carrying members positioned between the pairs of spaced endless means on said supporting means, drive means connected to said endless means to move said first endless means in a direction such that the supporting means of said first endless means passes upwardly along said generally vertical run past the end of said conveyor at which point a sheet from said conveyor may be looped over a carrying member, and to move said second endless means in a direction that the supporting means moves along said generally horizontal run in a direction away from said one end thereof whereby said carrying members move upwardly along said generally vertical run and move away from said one end along said generally horizontal run, means adjacent the upper end of said generally vertical run to transfer said carrying members from said generally vertical run to said generally horizontal run of said second endless means, and releasing means positioned along said generally horizontal run spaced from said one end thereof to unloop said sheet from about said member as said member moves along said generally horizontal run.

References Cited in the file of this patent

UNITED STATES PATENTS

| 1,924,612 | McCorkindale | Aug. 29, 1933 |
| 2,019,560 | Couch | Nov. 5, 1935 |
| 2,060,511 | Learnard | Nov. 10, 1936 |
| 2,278,602 | Wikle | Apr. 7, 1942 |

UNITED STATES PATENT OFFICE
Certificate of Correction

Patent No. 2,855,089             October 7, 1958

Roger L. Griffin

It is hereby certified that error appears in the above numbered patent requiring correction and that the said Letters Patent should read as corrected below.

In the drawings, Sheet 6, containing Fig. 12, and Sheet 7, containing Figs. 13, 14, and 15, as shown below, should be inserted as part of the Letters Patent; in the heading to the present 5 sheets of drawings, line 3, for "5 Sheets", each occurrence, read—7 Sheets—.